(12) United States Patent
Tix et al.

(10) Patent No.: US 11,572,876 B2
(45) Date of Patent: Feb. 7, 2023

(54) PUMP PISTON

(71) Applicant: Graco Minnesota Inc., Minneapolis, MN (US)

(72) Inventors: Joseph E. Tix, Hastings, MN (US); Jeffrey N. Velgersdyk, Minnetonka, MN (US); Samuel R. Stewart, Minneapolis, MN (US); Jacob T. Elmer, New Hope, MN (US); Roman S. Kopylov, Minneapolis, MN (US); Christopher J. Pellin, Burnsville, MN (US); Jeromy D. Horning, Albertville, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 637 days.

(21) Appl. No.: 16/116,436

(22) Filed: Aug. 29, 2018

(65) Prior Publication Data

US 2019/0063428 A1    Feb. 28, 2019

Related U.S. Application Data

(60) Provisional application No. 62/552,186, filed on Aug. 30, 2017.

(51) Int. Cl.
| | | |
|---|---|---|
| *F04B 53/12* | (2006.01) |
| *F04B 19/22* | (2006.01) |
| *F04B 53/10* | (2006.01) |
| *F16K 15/04* | (2006.01) |
| *F04B 45/02* | (2006.01) |
| *F16K 15/18* | (2006.01) |

(52) U.S. Cl.
CPC ............ *F04B 53/126* (2013.01); *F04B 19/22* (2013.01); *F04B 53/101* (2013.01); *F04B 53/1007* (2013.01); *F04B 45/02* (2013.01); *F16K 15/048* (2013.01); *F16K 15/1823* (2021.08)

(58) Field of Classification Search
CPC ...... F04B 53/12; F04B 53/125; F04B 53/126; F04B 53/101; F04B 53/1002; F04B 53/1005; F04B 53/1007; F04B 19/22; F04B 45/02; F16K 15/048; F16K 15/1823
See application file for complete search history.

(56) References Cited

U.S. PATENT DOCUMENTS

| | | | | |
|---|---|---|---|---|
| 254,010 A | * | 2/1882 | Heydrick | .............. F04B 53/126 417/554 |
| 484,898 A | * | 10/1892 | Lahm | .................. F04B 39/0016 417/552 |

(Continued)

FOREIGN PATENT DOCUMENTS

| | | |
|---|---|---|
| CA | 2122694 C | 5/1997 |
| CH | 597513 A5 | 4/1978 |

(Continued)

OTHER PUBLICATIONS

Third Chinese Office Action for Chinese Patent Application No. 2016800657646, dated Jul. 31, 2020, 16 pages.

(Continued)

*Primary Examiner* — Dominick L Plakkoottam
*Assistant Examiner* — Charles W Nichols
(74) *Attorney, Agent, or Firm* — Kinney & Lange, P.A.

(57) ABSTRACT

A pump having significantly minimized or no ullage for pumping material (fluid or aggregate).

28 Claims, 6 Drawing Sheets

(56) References Cited

U.S. PATENT DOCUMENTS

| | | | |
|---|---|---|---|
| 1,430,986 A | 10/1922 | Hallman | |
| 1,513,985 A | 11/1924 | Gunn et al. | |
| 1,543,179 A | 6/1925 | Miller et al. | |
| 1,714,398 A | 5/1929 | O'Bannon | |
| 1,714,434 A | 5/1929 | O'Bannon | |
| 1,931,938 A | 10/1933 | Pippin | |
| 2,007,888 A | 7/1935 | Ball | |
| 2,061,480 A | 11/1936 | Pigott | |
| 2,274,968 A | 3/1942 | O'Bannon | |
| 2,309,839 A | 2/1943 | Gardner | |
| 2,362,139 A | 11/1944 | Kelly | |
| 2,682,281 A | 6/1954 | Ecker | |
| 2,723,679 A | 11/1955 | Harris et al. | |
| 2,734,667 A | 2/1956 | Conklin | |
| 3,050,002 A | 4/1962 | Harris | |
| 3,059,667 A | 10/1962 | Coceano | |
| 3,077,204 A | 12/1963 | Bennett et al. | |
| 3,263,239 A | 8/1966 | Edwards et al. | |
| 3,295,822 A | 1/1967 | O'Bannon, Jr. et al. | |
| 3,371,352 A | 3/1968 | Siposs et al. | |
| 3,387,625 A | 6/1968 | Laure | |
| 3,542,155 A | 11/1970 | Kern | |
| 3,543,682 A | 12/1970 | Farrow et al. | |
| 3,620,228 A | 11/1971 | Schmid | |
| 3,637,328 A | 1/1972 | Kurokawa et al. | |
| 3,661,167 A | 5/1972 | Hussey | |
| 3,724,496 A | 4/1973 | Secrist | |
| 3,749,521 A | 7/1973 | Coone | |
| 3,896,723 A | 7/1975 | Farrow et al. | |
| 3,911,502 A | 10/1975 | Boretos | |
| 4,061,085 A | 12/1977 | Farrow | |
| 4,286,622 A | 9/1981 | Ninomiya et al. | |
| 4,287,912 A | 9/1981 | Hewett | |
| 4,291,763 A | 9/1981 | Singer | |
| 4,295,412 A | 10/1981 | Hachiro | |
| 4,611,374 A | 9/1986 | Schnelle et al. | |
| 4,667,696 A * | 5/1987 | van Rensburg | F16K 15/048 137/533.15 |
| 4,846,213 A | 7/1989 | Hutchens et al. | |
| 4,955,407 A | 9/1990 | Inoue | |
| 5,061,159 A | 10/1991 | Pryor | |
| 5,139,047 A | 8/1992 | Reinicke | |
| 5,178,184 A | 1/1993 | Skillman | |
| 5,232,014 A | 8/1993 | Hiltebrand | |
| 5,245,962 A | 9/1993 | Routery | |
| 5,395,219 A | 3/1995 | Hosoya et al. | |
| 5,435,697 A | 7/1995 | Guebeli et al. | |
| 5,567,135 A | 10/1996 | Mueller et al. | |
| 5,577,896 A | 11/1996 | Harada | |
| 5,593,289 A | 1/1997 | Tarpley | |
| 5,593,292 A | 1/1997 | Ivey | |
| 5,649,360 A | 7/1997 | Schwarz | |
| 5,653,258 A | 8/1997 | Schwarz | |
| 5,655,885 A * | 8/1997 | Chung | F04B 5/02 417/360 |
| 5,785,083 A | 7/1998 | Tang | |
| 5,971,015 A | 10/1999 | Gonsior | |
| 5,980,224 A | 11/1999 | Regueiro | |
| 5,988,994 A | 11/1999 | Berchowitz | |
| 6,029,685 A | 2/2000 | Carruth | |
| 6,155,806 A * | 12/2000 | Andel | F04B 53/1007 417/403 |
| 6,267,137 B1 | 7/2001 | Watanabe et al. | |
| 6,398,317 B1 | 7/2002 | Burgdorf et al. | |
| 6,679,684 B2 | 1/2004 | Kominami | |
| 6,685,451 B1 | 2/2004 | Ivey | |
| 6,764,286 B2 | 7/2004 | Hunnicutt et al. | |
| 6,830,441 B1 | 12/2004 | Williams | |
| 7,028,647 B2 | 4/2006 | Styron | |
| 7,444,990 B1 | 11/2008 | Fisher et al. | |
| 8,146,618 B2 | 4/2012 | Szuster | |
| 8,251,066 B1 | 8/2012 | Ho et al. | |
| 8,579,610 B2 | 11/2013 | Perkins, Jr. et al. | |
| 8,794,938 B2 | 8/2014 | Frey | |
| 9,140,245 B2 | 9/2015 | Nakai et al. | |
| 9,394,900 B2 | 7/2016 | Roman et al. | |
| 10,100,829 B2 | 10/2018 | Ford | |
| 2004/0120838 A1 | 6/2004 | Savidge et al. | |
| 2005/0121084 A1 | 6/2005 | Andersson | |
| 2005/0257927 A1 | 11/2005 | Coyes et al. | |
| 2006/0188380 A1 | 8/2006 | Strong | |
| 2010/0260404 A1 | 10/2010 | Ohishi | |
| 2010/0269928 A1 | 10/2010 | Ford | |
| 2013/0142684 A1 | 6/2013 | Asou | |
| 2014/0026987 A1 | 1/2014 | Ayers et al. | |
| 2015/0059882 A1 | 3/2015 | Kraus et al. | |
| 2015/0292492 A1 | 10/2015 | Kim | |
| 2016/0069344 A1 * | 3/2016 | Carey | F04B 5/02 417/213 |
| 2018/0066652 A1 | 3/2018 | Ford | |

FOREIGN PATENT DOCUMENTS

| | | |
|---|---|---|
| CN | 872211361 U | 9/1988 |
| CN | 2048906 U | 12/1989 |
| CN | 2065708 U | 11/1990 |
| CN | 1256377 A | 6/2000 |
| CN | 2811601 Y | 8/2006 |
| JP | 2000035146 A | 2/2000 |
| WO | WO2012149005 A2 | 11/2012 |

OTHER PUBLICATIONS

Third Chinese Office Action for Chinese Patent Application No. 2016800658634, dated Aug. 3, 2020, 17 pages.

* cited by examiner

PUMP PISTON

CROSS-REFERENCE TO RELATED APPLICATIONS

This application claims the benefit of U.S. Provisional Patent Application No. 62/552,186 filed Aug. 30, 2017, which is herein incorporated by reference in its entirety.

STATEMENT REGARDING FEDERALLY SPONSORED RESEARCH OR DEVELOPMENT

Not applicable.

TECHNICAL FIELD

The instant disclosure pertains to pumps, and more particularly, to reciprocating pumps for pumping relatively dense fluids.

BACKGROUND

Figure 1:
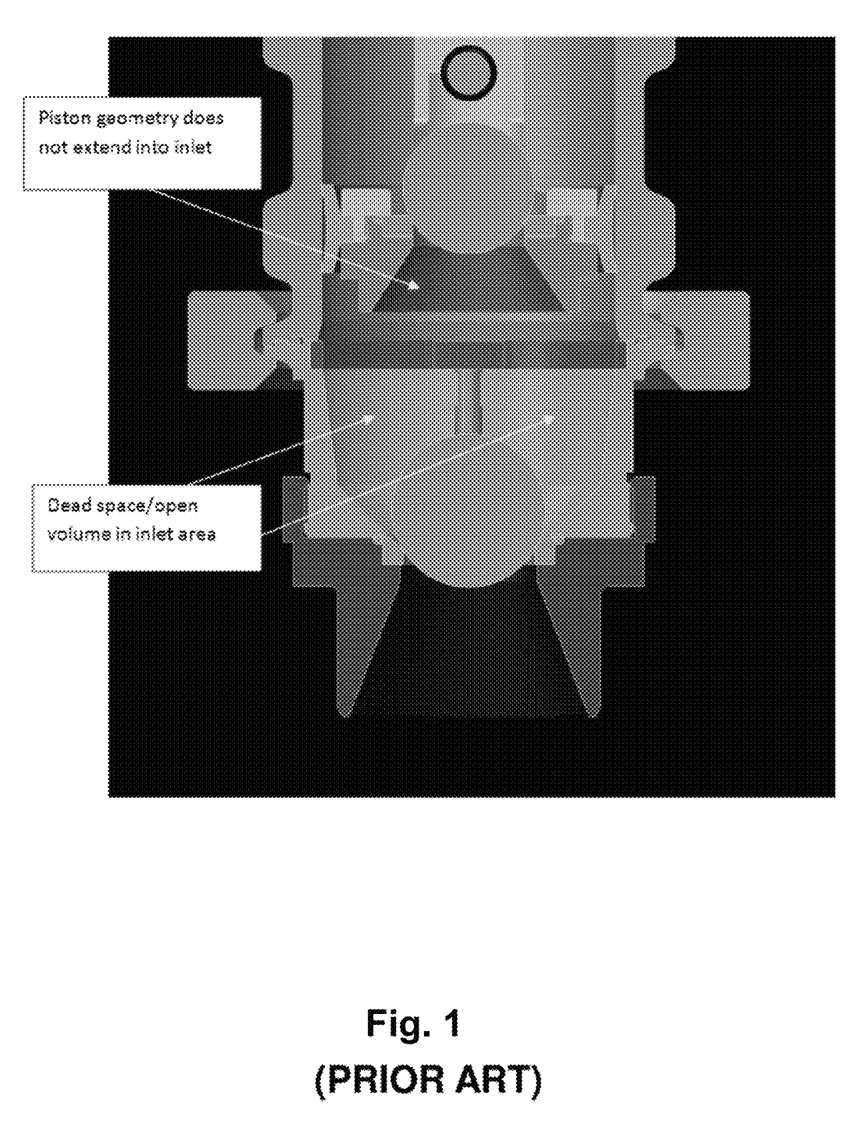
FIG. 1 is a cross-sectional image of a prior art reciprocating pump.

Certain pumps may be structured to pump fluids, including thick fluids such as mortar, stucco, exterior insulation finishing system (EIFS) materials, fireproofing material, and/or other viscous materials. FIG. 1 is a cross-sectional view of an exemplary prior art reciprocating pump having a piston and configured for pumping fireproofing material. In some such prior art pumps, the piston stops short of the inlet check ball, which creates a dead space in the inlet area. As such, the dead space (i.e., ullage) results in less efficient pump performance, especially when pumping compressible materials.

Accordingly, there exists a need for increasing the efficiency or performance of such pumps by significantly minimizing or eliminating ullage, i.e., dead space.

U.S. Pat. No. 1,931,938 to Pippin discloses movable valve body including a pair of sections having a liquid conduit extending therethrough, a tubular sleeve connecting said sections together and forming a valve chamber therebetween, a valve seat carried by the end of one of said sections, a ball valve carried in said chamber and normally resting on said seat, a longitudinally movable valve contacting head normally urging said valve to its seat, a stem carried by said head, a stud carried by said other section and having a tubular extension extending into said chamber, said stem being received in the lower end of said tubular extension, said stud having a plurality of upwardly converging liquid passages formed therein establishing communication between said chamber and said conduit in said section.

U.S. Pat. No. 2,362,139 to Kelly discloses a piston assembly, a piston rod, a piston formed integral with one end of said rod and having an axial bore extending therethrough and into said rod, said rod having a port therein opening into said bore, a cylindrical valve seat member in said bore between the outer end of the bore and said port insertable and removable through said outer end of the bore, a check valve mounted in said bore so as to seat against the inner end of said seat member, a spring mounted in said bore to hold said valve seated, and a snap ring mounted in said bore and holding the seat member, valve and spring in place.

U.S. Pat. No. 3,050,002 to Harris discloses a pump for pumping fluids having settleable particles comprising means defining an elongate upright cylinder, a reciprocatable main piston disposed in the cylinder for up and down reciprocations within the cylinder and defining together with the sidewall of the cylinder a discharge chamber between the upper side of the main piston and the top of the cylinder, and an inlet chamber between the lower side of the main piston and the bottom of the cylinder, an outlet providing flow communication between the discharge chamber and a point of discharge, an inlet providing flow communication between the inlet chamber and a source of a first fluid, a passage in the main piston providing flow communication between the discharge chamber and the inlet chamber, first valve means associated with the inlet to permit flow only into the inlet chamber, second valve means associated with the passage in the main piston to permit flow only from the inlet chamber into the discharge chamber, injection apertures peripherally spaced apart in the sidewall of the inlet chamber near the bottom of said chamber adjacent the first valve means, the injection apertures arranged to open into the inlet chamber tangentially to the sidewall of said chamber to inject a second fluid into the inlet chamber and around the first valve means, an elongate injection cylinder, the injection apertures providing flow communication between the inlet chamber and the injection cylinder, a reciprocatable injection piston disposed in the injection cylinder, a fluid inlet providing flow communication between the injection cylinder and a source of the second fluid, and means for reciprocating the main piston and the injection piston to inject the second fluid into the inlet chamber as the first fluid is discharged through the passage in the main piston.

U.S. Pat. No. 3,543,682 to Farrow discloses a feed mechanism for a printing machine in which printing ink is fed into the recessed design of an intaglio printing plate includes a cylinder open at its upper end and communicating at its bottom with the recessed designs. A piston is housed in the cylinder, the lower end of which piston forms a chamber at the bottom of the cylinder. The piston rod extends above the cylinder and carries a support member at its upper end, the support member carrying a head. A second cylinder rests upon the top of the first cylinder and receives the head which is slidable therein within limits. A spring is interposed between the head and the bottom of the second cylinder. The piston and piston rod have a bore forming a second chamber provided at its upper end with an ink supply inlet. A hollow relief piston is slidable in the lower end of the bore communicating with the second chamber and communicating through inlet openings with the first chamber. A ball valve in the lower end of the relief piston is normally spring-biased to close the outlet passage of the relief piston, and a second spring in the bore above the relief piston normally urges the relief piston into position in which the ball valve closes communication between the first chamber and the opening in the bottom of the first cylinder. The piston rod is adapted to receive printing pressure whereby the chambers will be contracted by the application of pressure on the printing plate during printing, and will expand when such pressure is released, the chamber expansion causing a further supply of ink to be sucked into the chambers ready for the next printing operation; and the ball valve being closed automatically by application of said pressure.

U.S. Pat. No. 3,637,328 to Kurokawa discloses a slurry-pumping means which comprises a driving pump, an intake diaphragm pump, an exhaust diaphragm pump connected therewith in series and an intermediate check valve, and driven by a fluid medium in such a manner that, while two unit volumes of the slurry are taken in by the intake diaphragm pump, one unit volume of the slurry contained in the exhaust diaphragm pump is exhausted out thereof, and, while the intake diaphragm pump does not take in the slurry, one unit volume previously taken in by the intake pump is exhausted from the exhaust pump and the other one unit volume previously taken in by the intake pump is accumulated in the exhaust pump and becomes the first-named one unit volume. By virtue of the above operating manner and a construction adapted thereto, the output becomes continuous with a uniform pressure. Various means for operation and maintenance thereof are also disclosed.

U.S. Pat. No. 3,749,521 to Coone discloses an aggregate reservoir that receives aggregate which is mixed by a plurality of mixer blades, one of each of which is mounted with one of each of a plurality of reciprocating shafts. One of each of the shafts extends outwardly into one of each of a plurality of conduits. As each of the reciprocating shafts moves inwardly in its respective conduit, expandable means mounted on the end of the shaft forces aggregate ahead of the shaft and through an opened gate or expandable means in the conduit. As each of the reciprocating shafts moves back toward the reservoir, the expandable means on the end of the shaft contracts and such gate with the respective conduit is closed to prevent aggregate from returning to the area of the respective reciprocating shaft. Each of the plurality of conduits is merged or joined into one single conduit some distance from their respective reciprocating shafts, and the aggregate from each of the conduits is moved through the single conduit to desired horizontal and/or vertical locations. The expandable means and/or gates include an inner sheath expandable material, a plurality of flexible reinforcing hard members and an outer sheath of expandable material, if desired.

U.S. Pat. No. 3,896,723 to Farrow discloses a liquid feed mechanism that feeds liquid to be deposited on a surface in a predetermined design through a die plate into recesses corresponding with the design. The mechanism has at least one pump chamber adapted to be contracted by the application of pressure from a press onto the die plate during depositing the liquid and to expand when the pressure is relaxed. The chamber has an outlet which communicates, in use, with one or more ink passages extending through the die plate, and an inlet which communicates, in use, with supply of the liquid. The inlet is controlled by a valve device which is closed automatically by the application of printing pressure on the die plate, the outlet being also controlled by a normally closed valve device which opens when the chamber is pressurized. The chamber has pressure relief means solely comprising a pressure relief piston biased inwardly against the pressure of printing fluid in the chamber and slidable outwardly, to relieve the pressure in the chamber when it exceeds a magnitude predetermined by the bias.

U.S. Pat. No. 4,061,085 to Farrow discloses a fluid injector unit, functioning as a pump-type injector unit through cooperation between an upper and lower press platen, being easily disassembled into a minimum number of parts for cleaning. Disengagement of a unitary assembly comprising a piston collar for supporting a main piston through biasing means therefor from a housing member containing a pump chamber results in easy access to those parts requiring cleaning without disassembly of parts external to fluid passages which do not require cleaning.

U.S. Pat. No. 5,395,219 to Hosoya, et al. discloses a hydraulic pump including a housing having a housing bore with a piston sliding in an axial direction in the bore and a pump chamber being defined in cavity adjacent one end of the piston. A piston drive mechanism is provided in a housing chamber defined in the bore adjacent the other end of the piston. Piston return springs are mounted in the pump chamber biasing the piston towards the piston drive mechanism. An inlet valve is arranged in the pump chamber opening and closing an axial bore in the piston connected to an inlet passage. An outlet valve is set on a downstream side of the pump chamber opening and closing an outlet passage. Two elastic seal members are mounted around a circumference of the piston respectively sealing an area between the pump chamber and the inlet passage and an area between the inlet passage and the housing chamber.

U.S. Pat. No. 5,577,896 to Harada discloses a pump which suppresses a decrease in the volumetric efficiency of the pump to a great extent even in case that the kinematic viscosity of a fluid is high with a compact structure of the pump itself. The pump provided with a first pump mechanism and a second pump mechanism comprises a housing having therein a first pump chamber, a second pump chamber, an intake port communicated with the first pump chamber, and a discharge port communicated with the second pump chamber, first valve means which open the communicating passage when the second pump chamber is compressed and close the communicating passage when the second pump chamber is expanded, a piston which expands the second pump chamber when the first pump chamber is compressed, and compresses the second pump chamber when the first pump chamber is expanded in accordance with movement thereof, second valve means which open so as to permit fluid to flow into the first pump chamber when the first pump chamber is expanded and close so as to prevent fluid in the first pump chamber from flowing out of the first pump chamber when the first pump chamber is compressed, and third valve means which open so as to discharge pressurized fluid in the second pump chamber when the second pump chamber is compressed and close when the second pump chamber is expanded.

U.S. Pat. No. 5,980,224 to Regueiro discloses an improved delivery valve for a plunger type fuel distribution pump characterized by ease of manufacture, lightness, and enhance performance in achieving both a check valve function and a retraction volume function. Specifically, previous machined constructions utilized a conically configured check valve and machined grooves which in the improved design are replaced by a commercially available high-precision, smoothly finished steel bearing ball element and by lightweight, tubular stem design.

U.S. Pat. No. 6,679,684 to Kominami discloses a pump device comprising a support member having a fitting recess, a movable member which is reciprocated in said fitting recess to suck a working fluid, pressurize the fluid and deliver the pressurized fluid, and a movement restricting device operable to deform a wall at least partially defining the fitting recess of the support member, such that the wall is deformed toward the movable member, for restricting a reciprocating movement of the movable member in the fitting recess, at least when an amount of the pressurized fluid required to be delivered by the pump device is smaller than a nominal delivery amount of the pump device.

U.S. Pat. No. 6,764,286 to Hunnicutt, et al. discloses a piston pump comprising cylinder attached within a cavity of a pump housing. An outlet check valve seat is defined about an outlet of the cylinder. A piston is slidably received in a bore of the cylinder and has a first passageway formed therein. A cylinder head encloses the outlet of the cylinder and defines a second passageway therein. The first passageway has an inlet in fluid communication with the cavity of the pump housing, and an outlet in fluid communication with a pumping chamber defined in the pump housing. A first spring retains the piston to the cylinder. A first check valve member is a ball retained near a valve seat formed in the first passageway of the piston by a disk spring, and allows fluid to flow only from the inlet to the outlet of the piston.

U.S. Pat. No. 8,794,938 to Frey discloses a cylinder piston arrangement for an especially volumetric fluid pump or a fluid motor, preferably comprising at least one axial expansion tubular membrane piston defining at least one inner pulsating working chamber. A particular field of application for such pumps or motors is the operation thereof with fluids loaded with extraneous materials, especially abrasive granulated materials. Especially high-speed machines with high working pressures of between a few hundred to a thousand bar are required, the energetic and also volumetric degree of efficiency thus becoming highly important factors. The aim of the invention is therefore to create pumps or fluid motors which are characterized by high degrees of efficiency and long service lives. To this end, at least one clearance driving body (TK1) is actively connected to the pulsating working chamber (AR).

U.S. Pat. No. 9,140,245 to Nakai, et al. discloses an electromagnetic pump having a cylinder with a stepped inner diameter with first and second inner diameters. A piston inside the cylinder, with a stepped outer diameter including first and second outer diameters slidable on the respective inner diameters, defines first and second fluid chambers. Reciprocal movement of the piston produces a greater change in volume in the first chamber than the second chamber. An electromagnetic portion moves the piston to decrease the volume of the first chamber and increase the volume of the second chamber. A biasing member moves the piston to increase the volume of the first chamber and decrease the volume of the second chamber. A first valve allows fluid to flow to the first chamber and prohibits reverse flow. A second valve embedded in the piston allows fluid to flow from the first chamber to the second chamber and prohibits reverse flow.

U.S. Pat. No. 9,394,900 to Roman, et al. discloses a reciprocating piston pump where, piston 34 has first or upper end 48 and second or bottom end 50 having inlet 52 and outlet 54 bores respectively located therein. Inlet check 32 is located in bore 52 while outlet check 42 is located in bore 54. Each of bores 52 and 54 branches into three (in the preferred embodiment) flow paths which alternate and are intertwined. The flow paths incorporating both the inlet and outlet check valves in the piston are claimed to be the key features of the invention.

SUMMARY

A non-limiting exemplary embodiment of a pump includes a pump housing having inlet and outlet ports, a piston disposed within the pump housing, a first check valve coupled to a first end of the piston, a valve housing coupled to the first check valve, a second check valve disposed upstream of the first check valve, and a piston rod coupled to a second end of the piston. The first check valve includes an inlet, and an outlet in fluid communication with the outlet port. The second check valve includes an inlet in fluid communication with the inlet port, and an outlet in fluid communication with the inlet of the first check valve. The valve housing is configured for receiving at least a portion of the second check valve.

Another non-limiting exemplary embodiment of a pump includes a pump housing having inlet and outlet ports, a piston disposed within the pump housing, a first check valve coupled to a first end of the piston, a valve housing coupled to the first check valve, a second check valve disposed upstream of the first check valve, a third check valve disposed downstream of the valve housing, and a piston rod coupled to a second end of the piston. The second check valve includes an inlet in fluid communication with the inlet port, and an outlet in fluid communication with an inlet of the first check valve. The third check valve includes an inlet in fluid communication with an outlet of the first check valve, and an outlet in fluid communication with the outlet port. The valve housing is configured for receiving at least a portion of the second check valve.

Yet another non-limiting exemplary embodiment of a pump includes a pump housing having inlet and outlet ports, a piston disposed within the pump housing, a valve housing coupled to a first end of the piston, a first check valve disposed at the inlet port, a second check valve disposed at the outlet port, and a piston rod coupled to a second end of the piston. The first check valve includes an inlet in fluid communication with the inlet port, and an outlet in fluid communication with the pump housing. The second check valve includes an inlet in fluid communication with the pump housing, and an outlet in fluid communication with the outlet port. The valve housing is configured for receiving at least a portion of the first check valve.

DETAILED DESCRIPTION

One or more non-limiting embodiments are described herein with reference to the accompanying drawings, wherein like numerals designate like elements. It should be clearly understood that there is no intent, implied or otherwise, to limit the disclosure in any way, shape or form to the embodiments illustrated and described herein. While multiple exemplary embodiments are provided, variations thereof will become apparent or obvious to a person of ordinary skills. Accordingly, any and all variants for providing functionalities similar to those described herein are considered as being within the metes and bounds of the instant disclosure.

Figure 2:
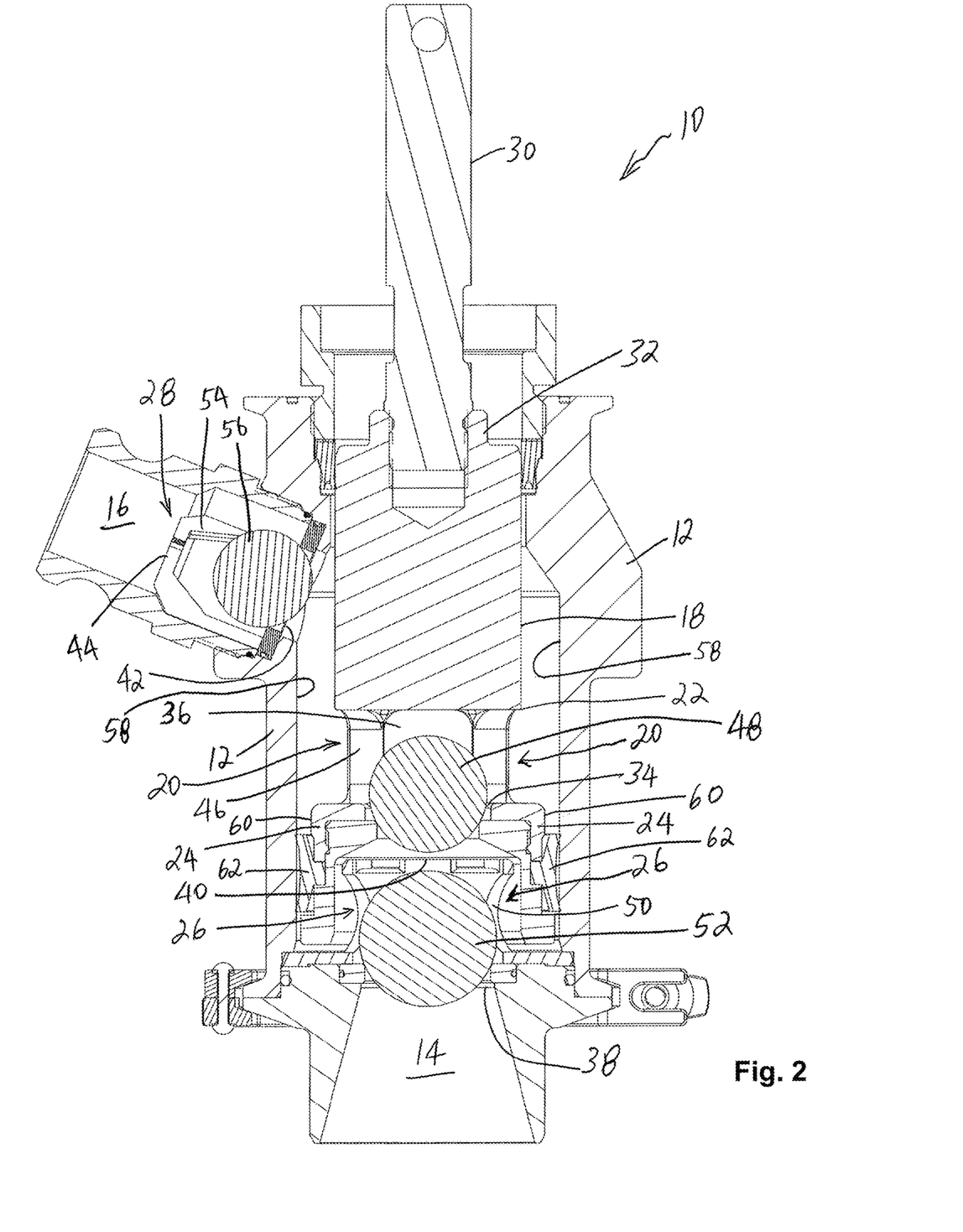
FIG. 2 is a cross-sectional view of a non-limiting exemplary embodiment of a pump of the instant disclosure.
Figure 3:
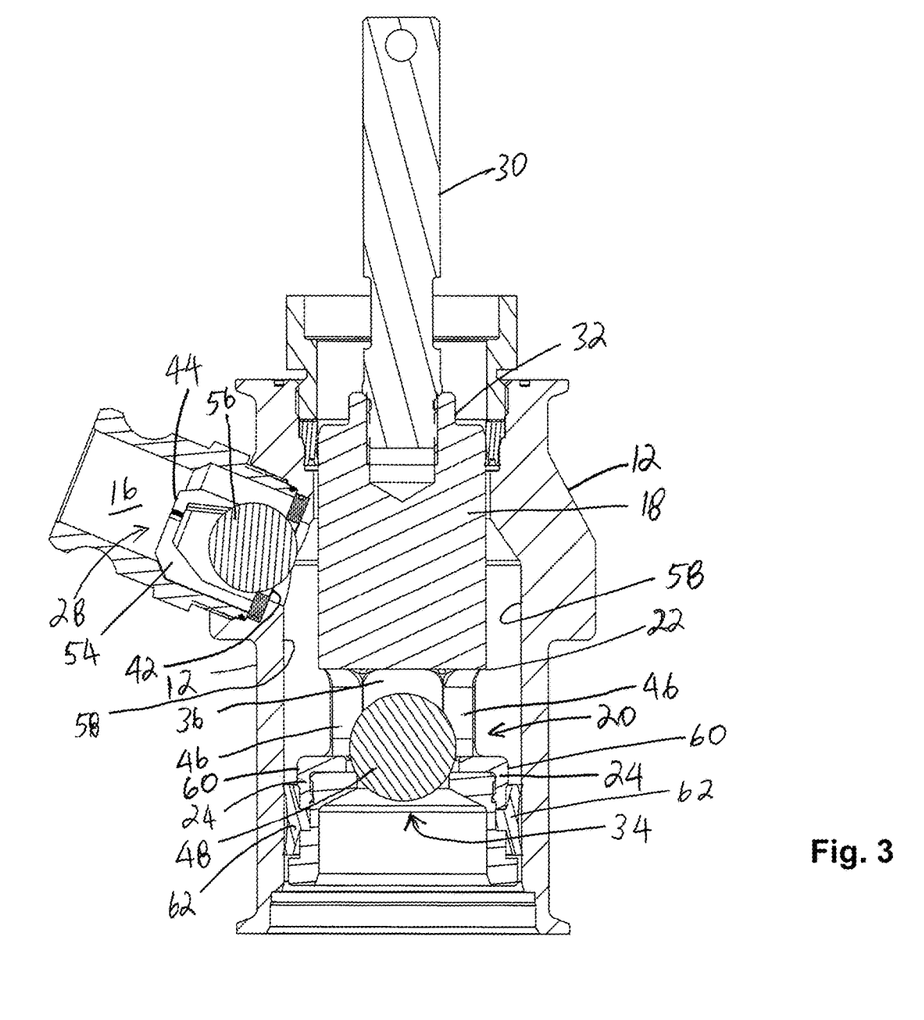
FIG. 3 is a cross-section view of a portion of the pump of FIG. 2.

FIG. 2 is a cross-sectional view of a non-limiting exemplary embodiment of a pump 10 of the instant disclosure; and FIG. 3 is a cross-sectional view of a portion of the pump 10. Pump 10 is defined, at least in part, by a pump housing 12 having an inlet port 14 and an outlet port 16, and a piston 18 disposed within the pump housing 12. Pump 10 additionally includes a first check valve 20 disposed at or coupled to a first end 22 of the piston 18, and a valve housing 24 coupled to the first check valve 20. Pump 10 additionally includes a second check valve 26 disposed upstream of the first check valve 20, and a third check valve 28 disposed downstream of the valve housing 24. A piston rod 30, coupled to a second end 32 of the piston 18, is provided for displacing the piston 18 within the pump housing 12.

In some non-limiting exemplary embodiments, the first check valve 20 includes an inlet 34 and an outlet 36, and is configured for permitting one-way material (fluid or aggregate) flow as is well known in the art. Accordingly, the first check valve 20 permits material (fluid or aggregate) flow from the inlet 34 to the outlet 36, and inhibits material (fluid or aggregate) flow in the reverse direction from the outlet 36 to the inlet 34.

In certain non-limiting exemplary embodiments, the second check valve 26 includes an inlet 38 and an outlet 40, and is configured for permitting one-way material (fluid or aggregate) flow as is well known in the art. Accordingly, the second check valve 26 permits material (fluid or aggregate) flow from the inlet 38 to the outlet 40, and inhibits material (fluid or aggregate) flow from the outlet 40 to the inlet 38. The inlet 38 of the second check valve 26 is in fluid communication with the pump inlet port 14, and the outlet 40 of the second check valve 26 is in fluid communication with the inlet 34 of the first check valve 20. As such, material (fluid or aggregate) entering the pump 10 via the pump inlet port 14 flows through the second check valve 26 and into the first check valve 20; however, flow in the reverse direction is inhibited at least in part by the second check valve 26.

In some non-limiting exemplary embodiments, the third check valve 28 includes an inlet 42 and an outlet 44, and is configured for permitting one-way material (fluid or aggregate) flow as is well known in the art. Accordingly, the third check valve 28 permits material (fluid or aggregate) flow from the inlet 42 to the outlet 44, and inhibits material (fluid or aggregate) flow from the outlet 44 to the inlet 42. The inlet 42 of the third check valve 28 is in fluid communication with the outlet 36 of the first check valve 20, and the outlet 44 of the third check valve 28 is in fluid communication with the pump outlet port 16. As such, material (fluid or aggregate) exiting the first check valve 20 via the outlet 36 flows through the third check valve 28 and exits the pump 10 via the pump outlet port 16; however, flow in the reverse direction is inhibited at least in part by the third check valve 28.

In certain non-limiting exemplary embodiments, one or more of the first, the second, and the third check valves 20, 26, and 28, respectively, are ball valves such as, for example but not limited to, those disclosed in Applicant's co-pending U.S. patent application Ser. Nos. 15/765,927, 15/767,809, and 15/772,797 which are herein incorporated by reference in their entirety. Briefly, a ball valve is defined, at least in part, by a ball or a plug disposed within a ball cage having an inlet and an outlet. When the pressure outside the valve inlet is greater than the pressure within the ball cage and/or the pressure outside the valve outlet, the ball is displaced away from the valve inlet and material (fluid or aggregate) enters the ball valve, i.e., the ball cage in particular. When the pressure outside the valve outlet and/or within the ball cage is greater than the pressure outside the valve inlet, the ball is displaced towards and is seated on, and seals, the valve inlet whereby material (fluid or aggregate) is prevented from exiting the ball valve via the valve inlet.

In some non-limiting exemplary embodiments, the first check valve 20 includes a valve body 46 defining the valve inlet 34 and valve outlet 36, and a plug or ball 48 housed within the valve body 46. The valve body 46 and the plug 48 are configured for uninhibited displacement of the plug 48 within the valve body 46. While the valve housing 24 is displaced or travels towards the pump outlet port 16, the plug 48 is seated on and seals the valve inlet 34 to inhibit flow across the valve inlet 34. While the valve housing 24 is displaced or travels towards the pump inlet port 14, the plug 48 is unseated from and unseals the valve inlet 34 to permit flow across the valve inlet 34 into the valve body 46. In some non-limiting exemplary embodiments, the plug 48 is defined at least in part by a substantially rigid core encased in a compliant coating.

In certain non-limiting exemplary embodiments, the second check valve 26 includes a valve body 50 defining the valve inlet 38 and valve outlet 40, and a plug or ball 52 housed within the valve body 50. The valve body 50 and the plug 52 are configured for uninhibited displacement of the plug 52 within the valve body 50. While the valve housing 24 is displaced or travels towards the pump inlet port 14, the plug 52 is seated on and seals the valve inlet 38 to inhibit flow across the valve inlet 38. While the valve housing 24 is displaced or travels towards the pump outlet port 16, the plug 52 is unseated from and unseals the valve inlet 38 to permit flow across the valve inlet 38 into the valve body 50. In certain non-limiting exemplary embodiments, the plug 52 is defined at least in part by a substantially rigid core encased in a compliant coating.

In some non-limiting exemplary embodiments, the third check valve 28 includes a valve body 54 defining the valve inlet 42 and valve outlet 44, and a plug or ball 56 housed within the valve body 54. The valve body 54 and the plug 56 are configured for uninhibited displacement of the plug 56 within the valve body 54. While the valve housing 24 is displaced or travels towards the pump inlet port 14, the plug 56 is seated on and seals the valve inlet 42 to inhibit flow across the valve inlet 42. While the valve housing 24 is displaced or travels towards the pump outlet port 16, the plug 56 is unseated from and unseals the valve inlet 42 to permit flow across the valve inlet 42 into the valve body 54. In some non-limiting exemplary embodiments, the plug 56 is defined at least in part by a substantially rigid core encased in a compliant coating.

In some non-limiting exemplary embodiments, the valve housing 24 is configured for substantially minimizing or eliminating ullage, i.e., dead space. Accordingly, the valve housing 24 is configured for receiving and/or housing at least a portion of the second check valve 26 as the first end 22 of the piston 18 approaches the inlet port 14. In certain non-limiting exemplary embodiment, the valve housing 24 is configured for receiving or housing the entirety of the second check valve 26 when the first end 22 of the piston 18 is proximate to the inlet port 14, i.e., when the piston 18 is at the end of its travel towards the inlet port 14. Consequently, the ullage (or dead space) will be minimized or eliminated. In some non-limiting exemplary embodiments, the valve housing 24 is configured for receiving less than the entirety of the second check valve 26.

In certain non-limiting exemplary embodiments, one or both the first check valve 20 and the valve housing 24 are integral with the piston 18 proximate the first end 22. In other words, one or both the first check valve 20 and the valve housing 24 are not discrete components coupled to the piston 18. In some non-limiting exemplary embodiments, one or both the first check valve 20 and the valve housing 24 are discrete components coupled or attached to the piston 18 proximate the first end 22. In other words, one or both the first check valve 20 and the valve housing 24 are not integrally formed with the piston 18.

In some non-limiting exemplary embodiments, an interior surface 58 of the pump housing 12 and an exterior surface 60 of the valve housing 24 are configured for inhibiting flow therebetween. In certain non-limiting exemplary embodiments, only one of the interior surface 58 and the exterior surface 60 is configured for inhibiting flow therebetween. In some non-limiting exemplary embodiments, a seal 62, configured for inhibiting flow between the pump housing 12 and the valve housing 24, is disposed around at least a portion of the exterior surface 60 of the valve housing 24.

In certain non-limiting exemplary embodiments, the pump 10 is configured as a double displacement reciprocating pump wherein the piston rod 30 is operatively coupled to a prime mover (not shown) for displacing or reciprocating the piston 18 within the pump housing 12.

In some non-limiting exemplary embodiments, while the first end 22 of the piston 18 is displaced or travels towards the outlet port 16, the pump 10 operates to seal or block the inlet 34 of the first check valve 20 and unseal or unblock respective inlets 38 and 42 of the second and third check valves 26 and 28. Material (fluid or aggregate) within the pump housing 12 between outlet 36 of the first check valve 20 and the inlet 42 of the third check valve 28 enters the third check valve 28 and is discharged from the outlet port 16 of the pump 10. Concurrently, material (fluid or aggregate) at the inlet port 14 of the pump 10 flows through the inlet 38 of the second check valve 26 into the pump housing 12 between respective inlets 34 and 38 of the first and second check valves 20 and 26. Such flow of material (fluid or aggregate), as described, continues until the piston 18 reaches its maximum displacement or travel towards the outlet port 16. Then, during the reverse cycle, i.e., while the first end 22 of the piston 18 is displaced or travels towards the inlet port 14, the pump 10 operates to seal or block respective inlets 38 and 42 of the second and third check valves 26 and 28, and unseal or unblock the inlet 34 of the first check valve 20. Material (fluid or aggregate) within the pump housing 12 between the inlet 34 of the first check valve 20 and the outlet 40 of the second check valve 26 flows through the inlet 34 of the first check valve 20 into the pump housing 12 between the outlet 36 of the first check valve 20 and the inlet 42 of the third check valve 28. Such flow of material (fluid or aggregate) continues until the piston 18 reaches its maximum displacement or travel towards the inlet port 14. Accordingly, the pump 10 pumps the material (fluid or aggregate) from the inlet port 14 to the outlet port 16 as the piston 18 reciprocates.

Figure 4:
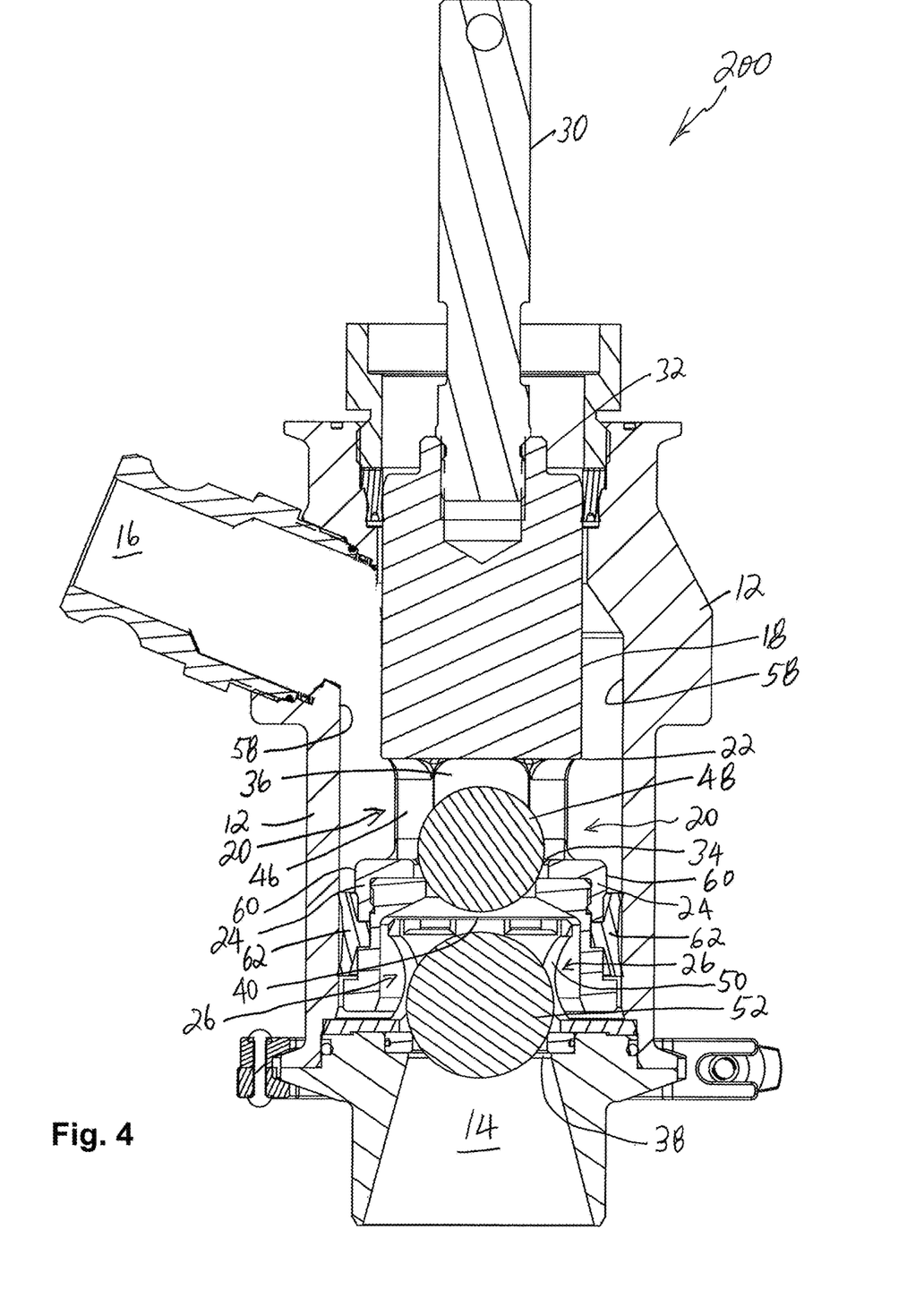
FIG. 4 is a cross-sectional view of another non-limiting exemplary embodiment of a pump of the instant disclosure.

FIG. 4 is a cross-sectional view of a non-limiting exemplary embodiment of a pump 200 of the instant disclosure. In several aspects, pump 200 is substantially similar to the pump 10 described in the foregoing with reference to FIGS. 2 and 3. Accordingly, like elements of the pumps 10 and 200 are identified by like reference numerals. One primary difference between the pumps 10 and 200 is that the pump 200 does not include the third check valve 28. Consequently, the outlet 36 of the first check valve 20 is in fluid communication with the pump outlet port 16.

In some non-limiting exemplary embodiments, while the first end 22 of the piston 18 is displaced or travels towards the outlet port 16 of the pump 200, the pump 200 operates to seal or block the inlet 34 of the first check valve 20 and unseal or unblock the inlet 38 of the second check valve 26. Material (fluid or aggregate) within the pump housing 12 between outlet 36 of the first check valve 20 and the pump outlet port 16 of the pump 200 is discharged from the pump 200 via the pump outlet port 16. Concurrently, material (fluid or aggregate) at the inlet port 14 of the pump 200 flows through the inlet 38 of the second check valve 26 into the pump housing 12 between respective inlets 34 and 38 of the first and second check valves 20 and 26. Such flow of material (fluid or aggregate), as described, continues until the piston 18 reaches its maximum displacement or travel towards the pump outlet port 16 of the pump 200. Then, during the reverse cycle, i.e., while the first end 22 of the piston 18 is displaced or travels towards the pump inlet port 14, the pump 200 operates to seal or block the inlet 38 of the second check valve 26, and unseal or unblock the inlet 34 of the first check valve 20. Material (fluid or aggregate) within the pump housing 12 between the inlet 34 of the first check valve 20 and the outlet 40 of the second check valve 26 flows through the inlet 34 of the first check valve 20 into the pump housing 12 between the outlet 36 of the first check valve 20 and the pump outlet port 16 of pump 200. Such flow of material (fluid or aggregate) continues until the piston 18 reaches its maximum displacement or travel towards the inlet port 14 of the pump 200. Thus, it will be readily apparent to one skilled in the art that the pump 200 pumps or transfers the material (fluid or aggregate) from the pump inlet port 14 to the pump outlet port 16 as the piston 18 reciprocates.

In certain non-limiting exemplary embodiments, the pump 200 is configured as a double displacement reciprocating pump wherein the piston rod 30 is operatively coupled to a prime mover (not shown) for displacing or reciprocating the piston 18 within the pump housing 12.

Figure 5:
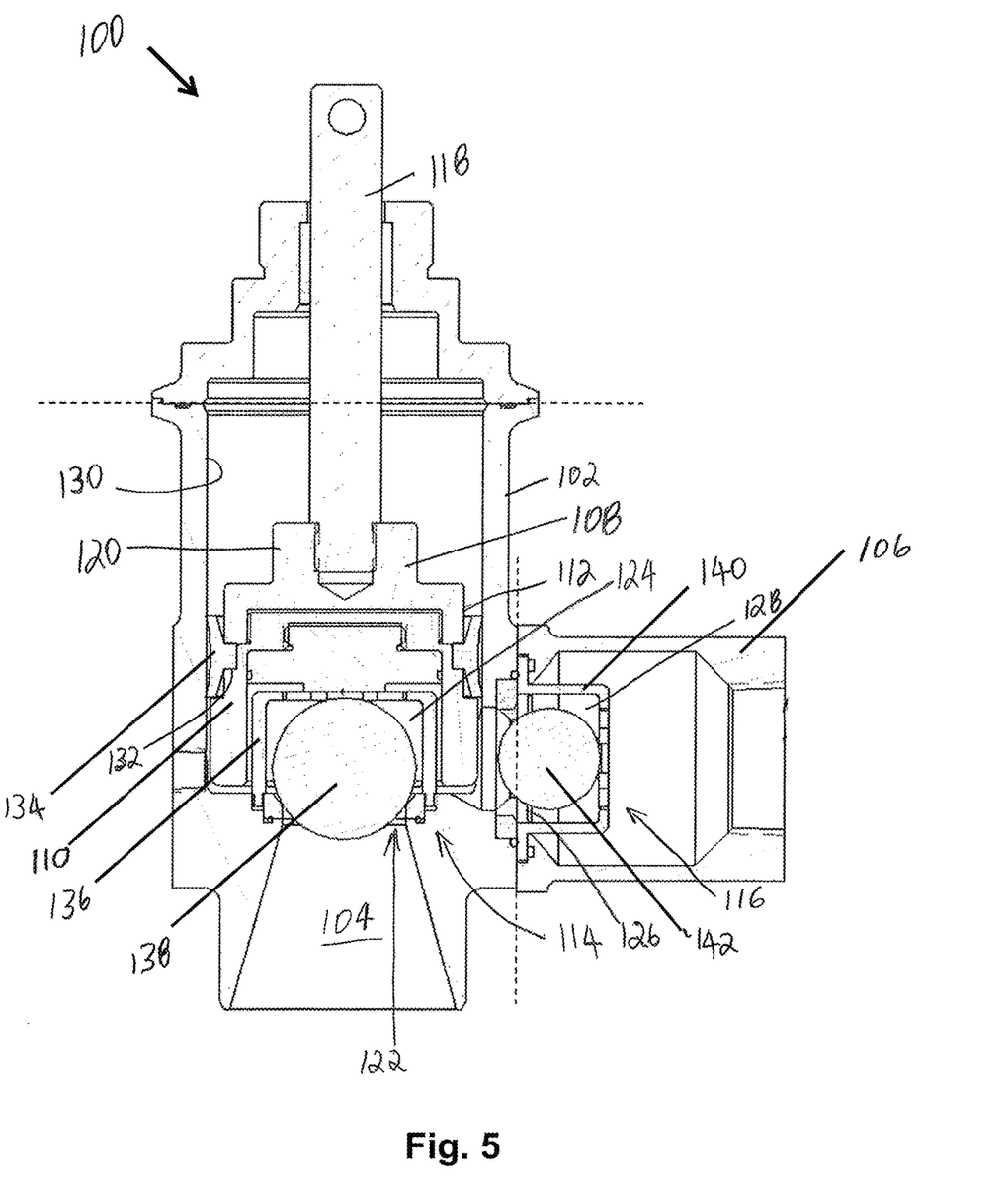
FIG. 5 is a cross-sectional view of yet another non-limiting exemplary embodiment of a pump of the instant disclosure.
Figure 6:
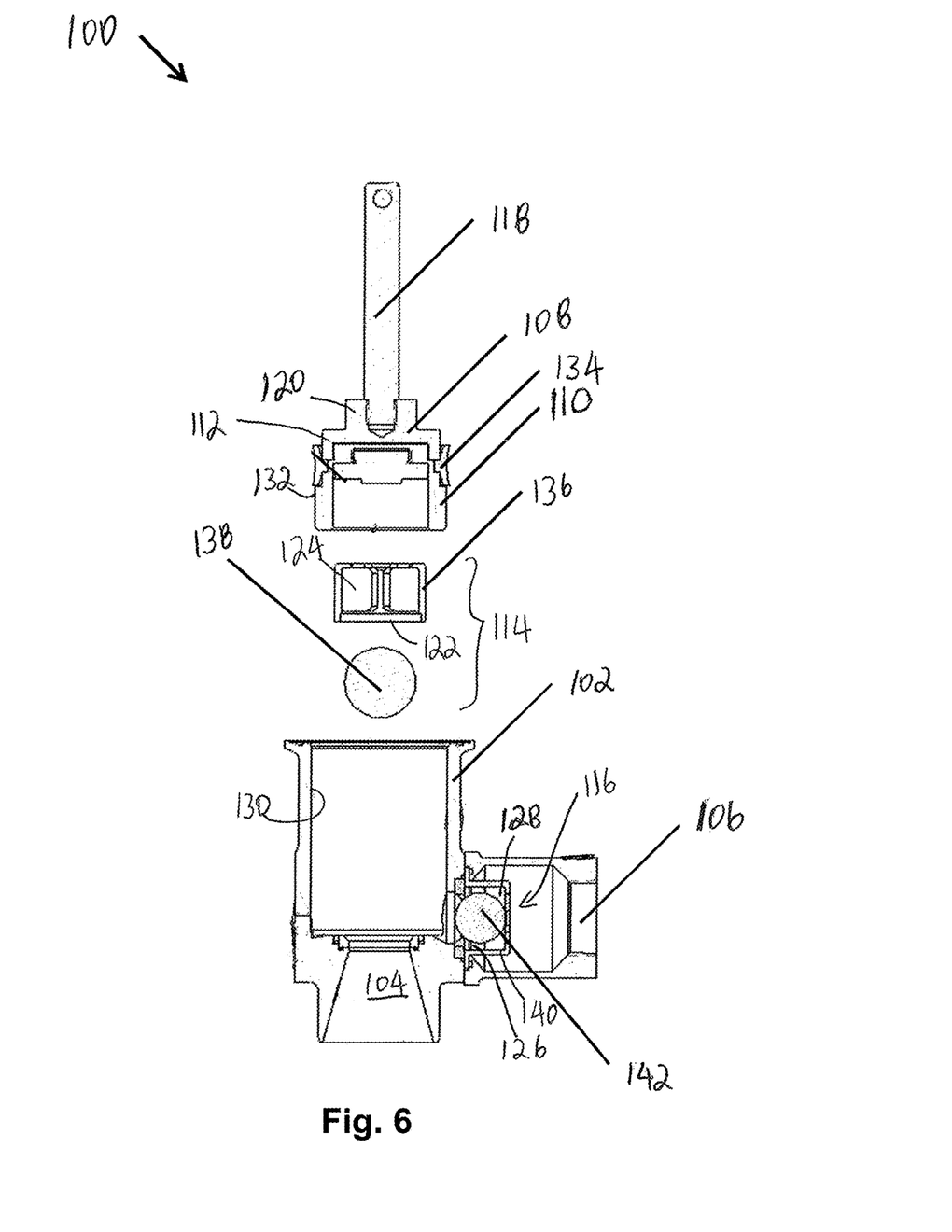
FIG. 6 is a cross-sectional view of a portion of the pump of FIG. 5.

FIG. 5 is a cross-sectional view of a pump 100 in accordance with another non-limiting exemplary embodiment of the instant disclosure; and FIG. 6 is a cross-sectional view of a portion of the pump 100. Pump 100 is defined, at least in part, by a pump housing 102 having an inlet port 104 and an outlet port 106, and a piston 108 disposed within the pump housing 102. Pump 100 includes a valve housing 110 disposed at or coupled to a first end 112 of the piston 108. Pump 100 additionally includes a first check valve 114 disposed at or coupled to the inlet port 104; and a second check valve 116 disposed at or coupled to the outlet port 106. A piston rod 118, coupled to a second end 120 of the piston 108, is provided for displacing the piston 108 within the pump housing 102.

In some non-limiting exemplary embodiments, the first check valve 114 includes an inlet 122 and an outlet 124, and is configured for permitting one-way material (fluid or aggregate) flow as is well known in the art. The inlet 122 of the first check valve 114 is in fluid communication with the pump inlet port 104, and the outlet 124 of the first check valve 114 is in fluid communication with the pump housing 102. Accordingly, the first check valve 114 permits material (fluid or aggregate) flow from the inlet 122 to the outlet 124 and into the pump housing 102, and inhibits material (fluid or aggregate) flow in the reverse direction from the pump housing 102 and the outlet 124 to the inlet 122. As such, material (fluid or aggregate) entering the pump 100 via the pump inlet port 104 flows through the first check valve 114 and into the pump housing 102; however, flow in the reverse direction is inhibited at least in part by the first check valve 114.

In certain non-limiting exemplary embodiments, the second check valve 116 includes an inlet 126 and an outlet 128, and is configured for permitting one-way material (fluid or aggregate) flow as is well known in the art. The inlet 126 of the second check valve 116 is in fluid communication with the pump housing 102, and the outlet 128 of the second check valve 116 is in fluid communication with the pump outlet port 106. Accordingly, the second check valve 116 permits material (fluid or aggregate) flow from the pump housing 102 and the inlet 126 to the outlet 128, and inhibits material (fluid or aggregate) flow from the outlet 128 to the inlet 126 and the pump housing 102. As such, material (fluid or aggregate) in the pump housing 102 enter the second check valve 116 through the inlet 126, and exits the pump 100 via the pump outlet port 106; however, flow in the reverse direction is inhibited at least in part by the second check valve 116.

In certain non-limiting exemplary embodiments, one or both the first and the second check valves 114 and 116, respectively, are ball valves such as those described in the foregoing for pump 10 with reference to FIGS. 2 and 3. In some non-limiting exemplary embodiments, the first check valve 114 is defined at least in part by a valve body 136 and a plug (or ball) 138. In certain non-limiting exemplary embodiments, the second check valve 116 is defined at least in part by a valve body 140 and a plug (or ball) 142.

In some non-limiting exemplary embodiments, the valve housing 110 is configured for substantially minimizing or eliminating ullage, i.e., dead space. Accordingly, the valve housing 110 is configured for receiving and/or housing at least a portion of the first check valve 114 as the first end 112 of the piston 108 approaches the inlet port 104. In certain non-limiting exemplary embodiment, the valve housing 110 is configured for receiving or housing the entirety of the first check valve 114 when the first end 112 of the piston 108 is proximate to the inlet port 104, i.e., when the piston 108 is at the end of its travel towards the inlet port 104. Consequently, the ullage (or dead space) will be minimized or eliminated. In some non-limiting exemplary embodiments, the valve housing 110 is configured for receiving less than the entirety of the first check valve 26.

In certain non-limiting exemplary embodiments, the valve housing 110 is integral with the piston 108 proximate the first end 112. In other words, the valve housing 110 is not a discrete component coupled to the piston 108. In some non-limiting exemplary embodiments, the valve housing 110 is a discrete components coupled or attached to the piston 108 proximate the first end 112. In other words, the valve housing 110 is not integrally formed with the piston 108.

In some non-limiting exemplary embodiments, an interior surface 130 of the pump housing 102 and an exterior surface 132 of the valve housing 110 are configured for inhibiting flow therebetween. In certain non-limiting exemplary embodiments, only one of the interior surface 130 and the exterior surface 132 is configured for inhibiting flow therebetween. In some non-limiting exemplary embodiments, a seal 134, configured for inhibiting flow between the pump housing 102 and the valve housing 110, is disposed around at least a portion of the exterior surface 132 of the valve housing 110.

In certain non-limiting exemplary embodiments, the pump 100 is configured as a single displacement reciprocating pump wherein the piston rod 118 is operatively coupled to a prime mover (not shown) for displacing or reciprocating the piston 108 within the pump housing 102.

In some non-limiting exemplary embodiments, while the valve housing 110 at the first end 112 of the piston 108 is displaced or travels towards the inlet port 104, the pump 100 operates to seal or block the inlet 122 of the first check valve 114 and unseal or unblock the inlet 126 of the second check valve 116. Material (fluid or aggregate) within the pump housing 102 between the first check valve 114 and the valve housing 110 at the first end 112 of the piston 108 enters the second check valve 116 through the inlet 126 and is discharged from the outlet port 106 of the pump 100. Then, during the reverse cycle, i.e., while valve housing 110 at the first end 112 of the piston 108 is displaced or travels away from the inlet port 104, the pump 100 operates to seal or block the inlet 126 of the second check valve 116, and unseal or unblock the inlet 122 of the first check valve 114. Material (fluid or aggregate) at the inlet port 104 of the pump 100 flows through the inlet 122 of the first check valve 114 and into the pump housing 102 between the first check valve 114 and the valve housing 110 until the piston 108 reaches its maximum displacement or travel away from the inlet port 104. Such flow of material (fluid or aggregate) continues until the piston 108 reaches its maximum displacement or travel away from the inlet port 104. Accordingly, the pump 100 pumps the material (fluid or aggregate) from the inlet port 104 to the outlet port 106 as the piston 108 reciprocates.

In view thereof, modified and/or alternate configurations of the embodiments described herein may become apparent or obvious to one of ordinary skill. All such variations are considered as being within the metes and bounds of the instant disclosure. For instance, while reference may have been made to particular feature(s) and/or function(s), the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:
1. A pump, comprising:
   a pump housing comprising an inlet port and an outlet port;
   a piston disposed within the pump housing, the piston comprising opposing first and second ends;
   a first check valve coupled to the first end of the piston, the first check valve comprising:
      an inlet; and
      an outlet in fluid communication with the outlet port;
   a valve housing coupled to the first check valve;
   a second check valve disposed upstream of the first check valve, the second check valve comprising:
      a valve body comprising an annular sidewall;
      a ball housed within the annular sidewall;
      an inlet in fluid communication with the inlet port; and
      an outlet in fluid communication with the inlet of the first check valve; and
   a piston rod coupled to the second end of the piston for providing reciprocating movement of the piston along an axis toward and away from the inlet port;
   wherein the valve housing is configured for surrounding at least a portion of the annular sidewall of the valve body of the second check valve when the piston is at an end of the travel toward the inlet port; and
   a seal supported by and moving with the valve housing and engaging an inner wall of the pump housing, wherein the seal radially overlaps at least part of the ball when the piston is at an end of travel toward the inlet port.

2. The pump of claim 1, wherein the first check valve is configured for inhibiting flow across the inlet thereof while the valve housing travels towards the outlet port.

3. The pump of claim 2, wherein the first check valve comprises:
   a valve body defining the inlet and the outlet of the first check valve; and
   a ball housed within the valve body;
   wherein,
      the valve body and the ball are configured for uninhibited displacement of the ball; and the ball and the inlet of the first check valve are configured for inhibiting flow across the inlet while the valve housing travels towards the outlet port.

4. The pump of claim 3, wherein the ball comprises a substantially rigid core encased in a compliant coating.

5. The pump of claim 1, wherein the second check valve is configured for inhibiting flow across the inlet thereof while the valve housing travels towards the inlet port.

6. The pump of claim 1, comprising a third check valve disposed downstream of the valve housing, the third check valve comprising:
an inlet in fluid communication with the outlet of the first check valve; and
an outlet in fluid communication with the outlet port.

7. The pump of claim 6, wherein the third check valve is configured for inhibiting flow across the inlet thereof while the valve housing travels towards the inlet port.

8. The pump of claim 6, wherein the third check valve comprises:
a valve body defining the inlet and the outlet of the third check valve; and
a ball housed within the valve body;
wherein,
the valve body and the plug are configured for uninhibited displacement of the ball; and
the ball and the inlet of the third check valve are configured for inhibiting flow across the inlet while the valve housing travels towards the inlet port.

9. The pump of claim 8, wherein the ball comprises a substantially rigid core encased in a compliant coating.

10. The pump of claim 1, wherein an interior surface of the pump housing and an exterior surface of the valve housing are configured for inhibiting flow therebetween.

11. The pump of claim 1, wherein an interior surface of the pump housing is configured for inhibiting flow between the pump housing and the valve housing.

12. The pump of claim 1, wherein an exterior surface of the valve housing is configured for inhibiting flow between the valve housing and the pump housing.

13. The pump of claim 1, wherein the seal is configured for inhibiting flow between the pump housing and the valve housing.

14. The pump of claim 1, configured as a double displacement reciprocating pump that produces flow of material from the inlet port to the outlet port when the piston moves toward the inlet port and when the piston moves away from the inlet pump.

15. The pump of claim 1, wherein
the first check valve is configured for inhibiting flow across the inlet thereof while the valve housing travels towards the outlet port; and
the second check valve is configured for inhibiting flow across the inlet thereof while the valve housing travels towards the inlet port.

16. The pump of claim 1, wherein the valve housing is configured for substantially minimizing or eliminating dead space near the inlet port.

17. A pump, comprising:
a pump housing comprising an inlet port and an outlet port;
a piston disposed within the pump housing, the piston comprising opposing first and second ends;
a valve housing coupled to the first end of the piston;
an inlet check valve disposed at the inlet port, the inlet check valve comprising:
a valve body having a sidewall with a plurality of openings extending through an annular outer surface of the sidewall;
a ball housed within the valve body;
an inlet in fluid communication with the inlet port; and
an outlet in fluid communication with the pump housing;
an outlet check valve disposed at the outlet port, the outlet check valve comprising:
a valve body;
a ball housed in the valve body;
an inlet in fluid communication with the pump housing; and
an outlet in fluid communication with the outlet port; and
a piston rod coupled to the second end of the piston for providing reciprocating movement of the piston;
wherein, the valve housing overlaps the openings extending through the annular outer surface of the sidewall of the valve body when the piston is at an end of travel of the inlet port.

18. The pump of claim 17, wherein the inlet check valve is configured for inhibiting flow across the inlet of the inlet check valve while the valve housing travels towards the inlet port.

19. The pump of claim 17, wherein the outlet check valve is configured for inhibiting flow across the inlet of the outlet check valve while the valve housing travels away from the inlet port.

20. The pump of claim 17, wherein an interior surface of the pump housing and an exterior surface of the valve housing are configured for inhibiting flow therebetween.

21. The pump of claim 17, wherein an interior surface of the pump housing is configured for inhibiting flow between the pump housing and the valve housing.

22. The pump of claim 17, wherein an exterior surface of the valve housing is configured for inhibiting flow between the valve housing and the pump housing.

23. The pump of claim 17, comprising a seal disposed around at least a portion of an exterior surface of the valve housing, the seal configured for inhibiting flow between the pump housing and the valve housing.

24. The pump of claim 17, wherein
the inlet check valve is configured for inhibiting flow across the inlet of the inlet check valve while the valve housing travels towards the inlet port; and
the outlet check valve is configured for inhibiting flow across the inlet of the outlet check valve while the valve housing travels away from the inlet port.

25. The pump of claim 17, wherein the valve body is configured for substantially minimizing or eliminating dead space near the inlet port.

26. A pump, comprising:
a pump housing comprising an inlet port and an outlet port;
a piston disposed within the pump housing, the piston comprising opposing first and second ends;
a first check valve coupled to the first end of the piston, the first check valve comprising:
an inlet; and
an outlet in fluid communication with the outlet port;
a second check valve disposed upstream of the first check valve, the second check valve comprising:
a valve body;
a ball housed in the valve body;
an inlet in fluid communication with the inlet port; and an outlet in fluid communication with the inlet of the first check valve; and
a piston rod coupled to the second end of the piston for providing reciprocating movement of the piston;
a valve housing coupled to and extending away from the first check valve; wherein, a leading end portion of the valve housing radially overlaps a centerpoint of the ball of the second check valve when the piston is at an end of the travel toward the inlet port, and
a seal supported by and moving with the valve housing and engaging an inner wall of the pump housing, wherein the seal radially overlaps at least part of the ball when the piston is at an end of travel toward the inlet port.

27. A pump, comprising:
a pump housing comprising an inlet port and an outlet port;
a piston disposed within the pump housing, the piston comprising opposing first and second ends;
a first check valve coupled to the first end of the piston, the first check valve comprising:
an inlet; and
an outlet in fluid communication with the outlet port;
a valve housing coupled to the first check valve;
a second check valve disposed upstream of the first check valve, the second check valve comprising:
a valve body;
a ball housed in the valve body;
an inlet in fluid communication with the inlet port; and
an outlet in fluid communication with the inlet of the first check valve;
a piston rod coupled to the second end of the piston; and
a seal supported by and moving with the valve housing and engaging an inner wall of the pump housing,
wherein the seal radially overlaps at least part of the ball when the piston is at an end of travel toward the inlet port.

28. A pump, comprising:
a pump housing comprising an inlet port and an outlet port;
a piston disposed within the pump housing, the piston comprising opposing first and second ends;
a first check valve coupled to the first end of the piston, the first check valve comprising:
an inlet; and
an outlet in fluid communication with the outlet port;
a valve housing coupled to the first check valve;
a second check valve disposed upstream of the first check valve, the second check valve comprising:
a valve body having a sidewall with a plurality of openings in the sidewall;
a ball housed within the valve body;
an inlet in fluid communication with the inlet port; and
an outlet in fluid communication with the inlet of the first check valve; a piston rod coupled to the second end of the piston for providing reciprocating movement of the piston; and
a seal supported by and moving with the valve housing and engaging an inner wall of the pump housing, wherein the seal radially overlaps at least part of the ball when the piston is at an end of travel toward the inlet port.

* * * * *